United States Patent [19]

Tournier

[11] Patent Number: 4,578,421

[45] Date of Patent: Mar. 25, 1986

[54] MATERIAL INTENDED TO FORM A JOINT BETWEEN TWO BODIES ON THE OUTSIDE OF THEIR INTERFACE, METHODS OF PRODUCING ASSEMBLIES WITH SUCH MATERIAL; ASSEMBLIES THUS OBTAINED

[75] Inventor: Jean-Louis Tournier, Riom, France

[73] Assignee: Compagnie Generale des Etablissements Michelin, Clermont-Ferrand, France

[21] Appl. No.: 503,757

[22] Filed: Jun. 13, 1983

[30] Foreign Application Priority Data

Jul. 2, 1982 [FR] France ............................ 82 11800

[51] Int. Cl.$^4$ ..................... C08L 47/00; C08L 61/04; C08L 9/00
[52] U.S. Cl. .................................. 524/511; 524/570; 524/571; 524/574; 524/575; 524/575.5
[58] Field of Search ............... 524/571, 392, 322, 191, 524/511, 570, 574, 575, 575.5

[56] References Cited

U.S. PATENT DOCUMENTS

| | | | |
|---|---|---|---|
| 2,291,208 | 7/1942 | Brown et al. | 524/511 |
| 2,376,854 | 5/1945 | Saunders et al. | 524/511 |
| 2,442,781 | 6/1948 | Rostler | 524/392 |
| 2,752,979 | 7/1956 | Knill et al. | 524/571 |
| 2,903,437 | 9/1959 | Van Epp . | |
| 3,008,912 | 11/1961 | Morris et al. | 524/511 |
| 3,039,509 | 6/1962 | Gruber | 524/511 |
| 3,443,620 | 5/1969 | Vanderbilt et al. | 523/203 |
| 4,261,407 | 4/1981 | Vosnick | 524/571 |
| 4,309,318 | 1/1982 | Ahagan et al. | 524/571 |
| 4,362,200 | 12/1982 | Standley | 524/571 |
| 4,377,418 | 3/1983 | Birchall et al. | 524/571 |
| 4,420,585 | 12/1983 | Lee et al. | 524/571 |
| 4,424,088 | 1/1984 | Durif | 156/286 |
| 4,426,468 | 1/1984 | Ornum et al. | 524/511 |
| 4,456,727 | 6/1984 | Middlebrook | 524/511 |

FOREIGN PATENT DOCUMENTS

| | | |
|---|---|---|
| 2152871 | 4/1973 | Fed. Rep. of Germany . |
| 2423062 | 12/1975 | Fed. Rep. of Germany . |
| 2130355 | 11/1972 | France . |
| 2152727 | 4/1973 | France . |
| 2496004 | 6/1982 | France . |
| 51-52460 | 5/1976 | Japan .................................. 524/571 |
| 56-79134 | 6/1981 | Japan .................................. 524/571 |
| 57-18749 | 1/1982 | Japan .................................. 524/511 |
| 960021 | 6/1964 | United Kingdom . |
| 1115321 | 5/1968 | United Kingdom ................ 524/571 |

*Primary Examiner*—Joseph L. Schofer
*Assistant Examiner*—N. Sarofin
*Attorney, Agent, or Firm*—Brumbaugh, Graves, Donohue & Raymond

[57] ABSTRACT

A material intended to form a joint between at least two bodies on the outside of their interface, at least one of the bodies being deformable, is characterized by the following features:

(a) it is formed of a fluid mixture having a viscosity, measured at normal temperature, of from 0.3 Pa.s to 700 Pa.s;

(b) a dry extract of the fluid mixture, measured at normal temperature and pressure, is from 20% by weight to 80% by weight, based on the weight of the fluid mixture;

(c) the dry extract of the fluid mixture comprises an elastomer fraction at least 20% by weight of which elastomer fraction is formed of at least one unsaturated elastomer capable of cross-linking either at ambient temperature or by heating for a period of time of less than one minute.

Methods for producing assemblies with this material, consisting, for instance, of manufacturing, repairing or recapping a tire.

Assemblies obtained by these methods.

14 Claims, 5 Drawing Figures

MATERIAL INTENDED TO FORM A JOINT BETWEEN TWO BODIES ON THE OUTSIDE OF THEIR INTERFACE, METHODS OF PRODUCING ASSEMBLIES WITH SUCH MATERIAL; ASSEMBLIES THUS OBTAINED

SPECIFICATION

The object of the present invention is a method of causing a face of one body to adhere to the face of another body, at least one of the bodies being deformable, for instance upon the manufacture, repair or recapping of tires for the wheels of vehicles.

Very strong adherence is desired, for instance, when it is desired to attach a tread or bars (in particular for tires intended for agricultural vehicles or public works vehicles) to the carcass of a tire or else when it is desired to hold a repair part (for instance a patch) of rubber on a damaged portion of a tire.

In order to assure as strong an attachment as possible between the two faces to be connected, it is customary to place the tire, provided with its tread or bars or its repair patch, within a heated enclosure which contains a wet or dry fluid under pressure, within which enclosure the two parts of the assembly are held applied strongly against each other under the effect of the pressure of the fluid, the heat acting to cross-link the elastomers which were not already cross-linked. For purposes of simplification, this simultaneous use of heat and pressure will be referred to as "curing" in the following description.

Between the two parts which are intended to be attached to each other there is generally placed a connecting layer in the form of a rubber, which may be applied in particular in the form of a deformable solid or of a solution if so desired. This connecting layer therefore forms a body arranged between two outer bodies formed of the two parts to be connected.

The carrying out of this process requires, on the one hand, that the air which is inevitably present between the faces to be assembled be withdrawn practically completely therefrom before curing, so that no air pocket, no matter how small, can jeopardize the firm adherence of the assembly upon its use after curing. Furthermore, it is absolutely necessary to prevent any infiltration of fluid under pressure between the faces of the assembly.

The means employed in order, on the one hand, to remove the air before curing and, on the other hand, to prevent any infiltration of fluid during such curing are increasingly complex, cumbersome, difficult to handle and costly the larger the size of the tires. When it is a question of recapping a tire, these means generally comprise a flexible air-tight membrane or sheath within which the tire is placed and which may be connected to a source of vacuum. One such membrane is described, for instance, in West German Provisional Patent Application (DAS) 1,094,976. The placing of the tire in this membrane is effected by hand and requires at times considerable physical force. Furthermore, rings must be used to assure tightness between the periphery of the membrane and the tire. These rings, which generally are made of metal, are frequently the cause of damage to the membrane, which must then be discarded after having been used only for a limited number of operations, which increases the operating expenses.

In French Pat. No. 2,030,005 it has already been proposed that the tire be placed within the curing enclosure without previously introducing it into a flexible airtight membrane. One of the variants of the process described in this patent comprises the following four steps:

(1) the new tread is applied to the carcass with the interposition of a layer of connecting rubber;
(2) the air enclosed between the carcass, the layer of connecting rubber and the tread is expelled by application of a roller;
(3) a heat-resistant material is applied, for instance by spraying or brushing, on the side faces of the tread and the carcass in order to avoid any relative displacement between the carcass and the tread;
(4) finally, the assembly is introduced into a curing enclosure.

The patent in which this known process is described does not give any information whatsoever as to what the heat-resistant material is.

Tests were carried out in order to find a material which makes it possible to operate effectively without a membrane or sheath of any kind, this material being applied on the outside of the interface or interfaces of the bodies, while assuring a practically perfect bond between the bodies and particularly one which is free of any inclusion of air.

The tests carried out with various elastomers customarily used in the rubber industry made it possible to obtain a perfect bond between the tread and the carcass only if all of the air had been expelled from between these two parts by very careful squeezing with a roller before application of the elastomer. Now while such roller-squeezing is conceivable under ideal operating conditions, the fact is that, in practice, in particular in the case of tires of very large size, the person who is in charge of this work does not carry it out with the full amount of care necessary. The possibility of the inclusion of air must therefore be feared and the cured tire which contains such inclusion may become unusable after only a few hours of operation.

During the course of these tests, it was discovered that the family of silicone elastomers made it possible to produce assemblies which give full satisfaction with respect to the elimination of air bubbles, as described in French Patent Application No. 80-26,741 (corresponds to U.S. application Ser. No. 327,937, filed Dec. 7, 1981, now U.S. Pat. No. 4,424,088).

However, these silicone elastomers have the drawback that they are not compatible with the elastomers currently used in industry, for instance for the production of tires, more particularly since they are well-known anti-sticking agents. Risk of contamination and separation must therefore be feared upon the use of these silicone elastomers, so that it is generally necessary to remove these silicone elastomers, for instance by brushing, before the cured assemblies are used, which increases the cost, particularly since the silicone products are expensive.

The present inventor therefore carried out tests with non-silicone elastomers compatible with the products customarily used in the rubber industry and found to his surprise that it was possible successfully to use a material having a base of such non-silicone elastomers provided that a special formulation was used.

The material in accordance with the present invention is characterized by the following features:

(a) it is formed of a fluid mixture having a viscosity, measured at normal temperature, of from 0.3 Pa.s to 700 Pa.s;

(b) a dry extract of the fluid mixture, measured at normal temperature and pressure, is from 20% by weight to 80% by weight, based on the weight of the fluid mixture;

(c) the dry extract of the fluid mixture comprises an elastomer fraction at least 20% by weight of which elastomer fraction is formed of at least one unsaturated elastomer capable of cross-linking either at ambient temperature or by heating for a period of time of less than one minute.

The present invention also concerns a method of producing an assembly comprising at least two bodies, at least one of the bodies being deformable, which consists in arranging one face of one of the bodies against one face of the other body and then applying a material intended to form a joint between the bodies over at least a part of the outside of their interface which is thus obtained, the assembly thus produced being intended thereupon to be cured after formation of the joint within a heated enclosure containing a fluid under pressure in such a manner that upon this curing the assembly is directly in contact with the fluid and the bodies adhere to each other, characterized by the following features:

(a) the faces are arranged against each other in such a manner that there are imperfect contacts between them which are capable of favoring the channeling of gas towards the outside of the assembly;

(b) the material has the characteristics previously defined in accordance with the invention;

(c) the amount of material applied is selected in such a manner that the joint obtained after cross-linking of the at least one unsaturated elastomer has a thickness of from 0.1 mm to 1 mm in the portion thereof covering the outside of the interface.

The present invention also concerns a method which consists in effecting the cross-linking of the at least one unsaturated elastomer either at ambient temperature or by heating for a period of time of less than one minute so as to obtain the joint.

The present invention also concerns a method which consists in curing the assembly, after formation of the joint by cross-linking, within a heated enclosure containing a fluid under pressure, the assembly being directly in contact with the fluid so that air enclosed between the faces of the bodies diffuses from the inside of the assembly towards the outside of the assembly, migrating through the joint, and so that the bodies adhere to each other.

The present invention also concerns the assemblies obtained, before or after curing, in accordance with the methods previously defined.

The figures of the accompanying drawing, all of which are schematic, together with the description thereof as well as the examples which follow, are intended to illustrate the present invention and facilitate an understanding thereof without, however, limiting its scope.

In the drawing

Figure 1:
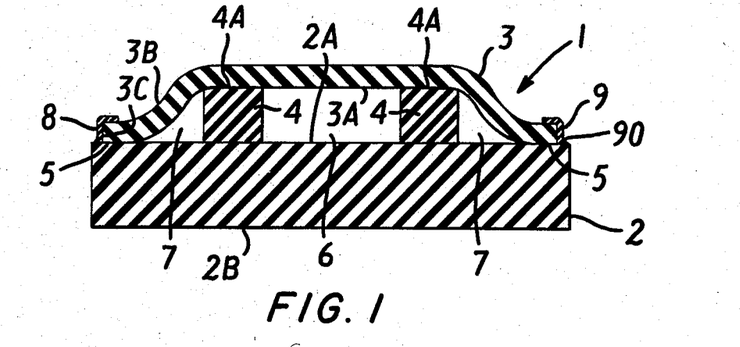
FIG. 1 is a cross-section, before curing, of an assembly which can be produced in accordance with the present invention.

FIG. 1 shows an assembly 1 which forms a test piece intended to demonstrate the carrying out of the methods in accordance with the present invention.

The test piece 1 comprises two bodies 2, 3 which it is desired to bond to each other, at least one of these bodies being deformable. By way of example, the body 2 is a slab of cross-linked rubber of a thickness of 2 cm, the principal faces 2A, 2B of this slab each having the shape of a square of a side of 10 cm. The body 3 is a slab of cross-linkable rubber which has not yet been cross-linked. This slab has a thickness of about 5 mm and deforms easily in view of the malleability of the raw, that is to say, non-cross-linked rubber.

Each of the bodies 2, 3 is preferably made with at least one homopolymeric or copolymeric unsaturated elastomer, such as, for instance, a natural rubber, a polyisoprene, a polybutadiene, a polychloroprene, a styrene-butadiene copolymer, an isobutylene-isoprene copolymer, possibly halogenated, a terpolymer having a base of ethylene and propylene (EPT), a mixture of these elastomers with each other and/or with one or more other materials which, in particular, may be saturated elastomers such as, for instance, a polyisobutylene or an ethylene-propylene copolymer (EPR). These bodies 2, 3 contain furthermore ingredients customarily used in the rubber industry, such as, for instance, cross-linking agents, especially sulfur, cross-linking accelerators and fillers. The known formulas which make it possible to obtain the bodies 2, 3 may therefore vary greatly and they are not detailed in this example in order to simplify the description.

The test piece 1 is made in the following manner. The face 2A of the body 2 is roughened, for instance, by brushing. Two bars 4 of non-cross-linked rubber whose definition corresponds, for instance, to that given previously for the bodies 2, 3 are then placed on the face 2A. These bars 4 have a length of about 8 cm and a square cross-section, their thickness being about 1 cm.

These bars 4 are arranged in such a manner that they are parallel to each other and to two sides of the face 2A, the bars being about 3 cm apart.

The body 3 is then arranged in such a manner that its principal face 3A is in contact with the upper face 4A of each bar 4 and in contact with the face 2A of the body 2, the other principal face, directed toward the outside, of the body 3 being marked 3B and the side face of this body 3 being marked 3C.

The faces 2A, 3A are in contact with each other, thus defining an interface 5 which surrounds the bars 4. These bars 4 are thus surrounded by the bodies 2, 3. Due to the roughness of the face 2A, there are imperfect contacts between the faces 2A, 3A at the interface 5. As a result of the presence of the bars, a substantial amount of air is enclosed between the bodies 2, 3, on the one hand, within the enclosure 6 at the center between the bars 4 and, on the other hand, within the enclosure 7 at the periphery between the interface 5 and the bars 4.

A material 8 which is intended to form a joint between the two bodies 2, 3 is then applied onto the outside of the interface 5, the material 8 thus covering the faces 2A, 3B, 3C of the bodies 2, 3 over the entire periphery of the assembly 1; that is to say, it straddles the bodies 2, 3. The material 8 may be applied in various ways, for instance by a brush, a gun, a spatula, a doctor blade or by dipping. The application can be effected in one or more layers, if desired.

In accordance with the present invention, the material 8 has the following characteristics:

(a) It is formed of a fluid mixture whose viscosity measured by a Brookfield viscosimeter at normal temperature (20° C.) is from 0.3 Pa.s (300 cP) to 700 Pa.s (7000 P). This viscosity is preferably from 10 Pa.s (100 P) to 50 Pa.s (500 P).

(b) A dry extract of the fluid mixture, measured at normal temperature and pressure (20° C., 1 bar), is from 20% by weight to 80% by weight. This dry extract is preferably from 30% by weight to 70% by weight. These percentages by weight are based on the weight of the fluid mixture, the dry extract being obtained by evaporation of the volatile fluid or fluids from this fluid mixture at normal temperature and pressure.

(c) The dry extract of the fluid mixture comprises an elastomer fraction at least 20% by weight of which elastomer fraction is formed of at least one unsaturated elastomer capable of cross-linking either at ambient temperature or by heating for a period of time of less than one minute. This unsaturated elastomer may be a homopolymer or copolymer, such as, for instance, a natural rubber, a polyisoprene, a polybutadiene, a polychloroprene, a styrene-butadiene copolymer, an isobutylene-isoprene copolymer, possibly halogenated, or a terpolymer having a base of ethylene and propylene (EPT). The elastomer fraction may furthermore contain several unsaturated elastomers, for instance several of the elastomers mentioned above. The elastomer fraction may also contain one or more saturated elastomers, such as, for instance, a polyisobutylene or an ethylene-propylene copolymer (EPR). The elastomer fraction preferably is formed of at least 60% by weight of at least one unsaturated elastomer and advantageously at least 80% by weight of at least one unsaturated elastomer.

The elastomer fraction preferably represents at least 40% by weight of the dry extract and advantageously at least 60% by weight of the dry extract.

The arithmetic molecular weight $P_{ma}$ of the elastomer fraction is preferably from 6,000 to 600,000.

The arithmetic molecular weight $P_{ma}$ is defined:
either by the average molecular weight of the unsaturated elastomer if the elastomer fraction consists entirely of this unsaturated elastomer;
or by the equation $P_{ma} = \Sigma p_e P_{me}$ in which $p_e$ represents the percentage by weight of each elastomer (unsaturated or saturated) in the elastomer fraction, if the latter consists of an elastomer mixture, and $P_{me}$ represents the average molecular weight of this elastomer. $P_{ma}$ is therefore defined in this case by the sum of all the products $p_e P_{me}$ with, to be sure, $\Sigma_e = 1$.

The average molecular weight $P_{me}$ of the elastomer or each elastomer represents a number-average molecular weight and is determined by osmometry on a solution of the elastomer in question in toluene at 35° C.

The liquid portion of the material may consist, for instance, of one or more solvents which are known per se and are compatible with the elastomer fraction, such as, for instance, one or more hydrocarbon solvents. This liquid portion may also consist in part of one or more elastomers, which then remain in the dry extract.

The cross-linking of the unsaturated elastomer or elastomers at ambient temperature or by heating for a period of time of less than one minute can be effected, for instance, by using radiations or adapted cross-linking systems comprising cross-linking agents and possibly cross-linking accelerators.

As cross-linking agent sulfur can, for instance, be used.

In this case the proportion of sulfur is preferably from 3 pphe to 9 pphe, the abbreviation "pphe" standing for "parts by weight per 100 parts by weight of the elastomer fraction."

As cross-linking agent one can also use, for instance, one or more quinones, in particular parabenzoquinone dioxime or dibenzoyl paraquinone dioxime. In this case, the proportion of quinone or of the total of the quinones is preferably from 5 pphe to 30 pphe.

As cross-linking accelerators which are particularly suitable with sulfur one may use, for instance:
one or more xanthates, in particular sodium isopropylxanthate, zinc ethylxanthate, zinc butylxanthate, dibutyl xanthogen disulfide, the preferred xanthate being zinc isopropylxanthate; the proportion of xanthate or of the total xanthates is preferably from 1 pphe to 4 pphe;
one or more amines, in particular dibutylamine, cyclohexylethylamine or dibenzylamine, the preferred amine being dibutylamine; the proportion of the amine or of the total amines is preferably from 0.2 pphe to 1 pphe;
one or more carbamates, in particular sodium diethyldithiocarbamate, sodium dibutyldithiocarbamate, zinc dibutyldithiocarbamate, zinc dibenzyldithiocarbamate or N,N-dimethylcyclohexylammonium dibutyldithiocarbamate, the preferred carbamate being zinc dibutyldithiocarbamate; the proportion of carbamate or of the total carbamates is preferably from 2 pphe to 4 pphe.

Preferably, when the aforementioned accelerators are used jointly with sulfur, at least two of these accelerators belonging to different families are used in the material, for instance a mixture of zinc isopropylxanthate, dibutylamine and zinc dibutyldithiocarbamate in the proportions previously defined. A synergic effect is thus obtained which favors the rapidity of the cross-linking.

As other cross-linking accelerators one may use one or more metallic oxides, either with sulfur or with other cross-linking agents, for instance quinones. Such oxides comprise, for instance, zinc oxide (ZnO), lead oxide ($PbO_2$) and magnesium oxide (MgO), the proportion of the oxide or of the total oxides being preferably from 2 pphe to 10 pphe.

The material may furthermore contain adjuvants and various fillers customarily employed in the rubber industry such as, for instance: stearic acid, preferably in a proportion of from 0.5 pphe to 3 pphe; silica, preferably in a proportion of from 10pphe to 50 pphe; carbon black, preferably in a proportion of from 10 pphe to 50 pphe; and natural or synthetic organic resins, in particular phenol resins, preferably in a proportion of from 5 pphe to 15 pphe.

All the proportions given above with respect to the elastomer fraction, the cross-linking agents, the cross-linking accelerators and the various adjuvants and fillers correspond to the dry extract of the material.

By way of example, the material 8 was produced in succession with one of the formulas $F_1$, $F_2$, $F_3$, $F_4$ $F_5$, $F_6$, $F_7$, $F_8$, $F_9$, the composition and properties of which are given in the following Table 1.

TABLE 1

| Formula | $F_1$ | $F_2$ | $F_3$ | $F_4$ | $F_5$ |
| --- | --- | --- | --- | --- | --- |
| Nature of the elastomer fraction | NR | PB | PI | PCIR | SBR |
| Average molecular weight of each elastomer | 600,000 | 150,000 | 6,000 | 100,000 | 120,000 |
| Arithmetic molecular weight $P_{ma}$ | 600,000 | 150,000 | 6,000 | 100,000 | 120,000 |
| Composition of the dry extract (parts by weight) | | | | | |
| elastomer fraction | 100 | 100 | 100 | 100 | 100 |
| zinc oxide (ZnO) | 3 | 3 | 3 | 3 | 3 |
| stearic acid | 1 | 1 | 1 | 1 | 1 |
| zinc isopropylxanthate | 2 | 2 | 2 | 2 | 2 |
| dibutylamine | 0.8 | 0.8 | 0.8 | 0.8 | 0.8 |
| zinc dibutyldithiocarbamate | 3.2 | 3.2 | 3.2 | 3.2 | 3.2 |
| sulfur | 4 | 4 | 3 | 4 | 3 |
| HAF black (N 330) | | | 20 | | |
| silica | | | | 40 | |
| Nature of the solvent | 100/160 | 100/160 | 90/120 | methylisobutyl ketone | 100/160 |
| % of dry extract | 30% | 30% | 70% | 40% | 30% |
| Viscosity (Pa · s) measured in a Brookfield viscosimeter | 40 | 25 | 30 | 20 | 25 |
| Permeability of the joint obtained after cross-linking ($m^3 \cdot m/s \cdot m^2 \cdot Pa$) (ISO Standard 2782) | $1.6 \times 10^{-16}$ | $9.6 \times 10^{-17}$ | $3.2 \times 10^{-17}$ | $1.9 \times 10^{-17}$ | $9 \times 10^{-17}$ |

| Formula | $F_6$ | $F_7$ | $F_8$ | $F_9$ |
| --- | --- | --- | --- | --- |
| Nature of the elastomer fraction | PI + NR | SBR + PI | PI + ClIIR | PI + IR |
| Average molecular weight of each elastomer | PI = 6,000 NR = 600,000 | SBR = 120,000 PI = 6,000 | PI = 600,000 ClIIR = 350,000 | PI = 600,000 IR = 450,000 |
| Arithmetic molecular weight $P_{ma}$ | 62,430 | 16,830 | 575,000 | 585,000 |
| Composition of the dry extract (parts by weight) | | | | |
| elastomer fraction | 100 | 100 | 100 | 100 |
| zinc oxide (ZnO) | 2.85 | 3 | 3 | 3 |
| stearic acid | 0.95 | 1 | 1 | 1 |
| zinc isopropylxanthate | 1.9 | 2 | 2 | 2 |
| dibutylamine | 0.8 | 0.8 | 0.8 | 0.8 |
| zinc dibutyldithiocarbamate | 3.2 | 3.2 | 3.2 | 3.2 |
| sulfur | 3.8 | 4 | 4 | 4 |
| HAF black (N 330) | | | 10 | 10 |
| Nature of the solvent | 100/130 | 100/160 | 100/160 | 100/160 |
| % of dry extract | 60% | 60% | 30% | 30% |
| Viscosity (Pa · s) measured in a Brookfield viscosimeter | 33 | 30 | 35 | 35 |
| Permeability of the joint obtained after cross-linking ($m^3 \cdot m/s \cdot m^2 \cdot Pa$) (ISO Standard 2782) | $7.7 \times 10^{-17}$ | $6.4 \times 10^{-17}$ | $2 \times 10^{-16}$ | $2 \times 10^{-16}$ |

Remarks Concerning Table 1
1. Nature and constitution of the elastomer fraction
the abbreviations used are as follows:
NR: natural rubber; PB: polybutadiene; PI: polyisoprene; PCIR: polychloroprene; SBR: styrene-butadiene copolymer; ClIIR: chlorinated isobutylene-isoprene copolymer; IR: polyisobutylene.
the compositions $F_1$, $F_2$, $F_3$, $F_4$, $F_5$ each comprise an elastomer fraction formed of a single elastomer which is unsaturated;
the compositions $F_6$, $F_7$, $F_8$ each comprise an elastomer fraction formed of two elastomers which are unsaturated. The constitution of these elastomer fractions is as follows (parts by weight):
for $F_6$: 90.5 parts of polyisoprene and 9.5 parts of natural rubber;
for $F_7$: 9.5 parts of styrene-butadiene copolymer and 90.5 parts of polyisoprene;
for $F_8$: 90 parts of polyisoprene and 10 parts of chlorinated isobutylene-isoprene copolymer;
composition $F_9$ comprises an elastomer fraction formed of an unsaturated elastomer and a saturated elastomer, the constitution of this elastomer fraction being as follows (parts by weight):
90 parts of polyisoprene and 10 parts of polyisobutylene.
2. Nature of the solvent
the abbreviations 100/160, 90/120, 100/130 correspond to petroleum distillation fractions under a pressure of one bar between the temperatures of:
100° C. and 160° C. in the case of solvent 100/160
90° C. and 120° C. in the case of solvent 90/120
100° C. and 130° C. in the case of solvent 100/130.

After having applied the material 8, the test piece is left at ambient temperature (about 20° C.) for a period of time sufficient to cause the evaporation of the solvent and the cross-linking of the unsaturated elastomer or elastomers of this material. This time may vary from 24 hours to 72 hours, depending on the formulas $F_1$ to $F_9$.

After cross-linking, the total thickness of the elastic film 9 thus obtained in one or more layers and forming a joint between the bodies 2, 3 is from 0.1 mm to 1 mm in the portion 90 thereof which covers the outside of the interface 5, the rest of the joint 9 being of any thickness. This joint 9 extends, for instance, over a width of 1 mm to 10 mm on both sides of the interface 5.

The test piece is then arranged in an enclosure into which a heated fluid is introduced under pressure, the assembly being in direct contact with the fluid. The curing is thus effected in this enclosure and therefore, upon this curing, the cross-linking of the unsaturated elastomers contained in the body 3 and the bars 4 as well as the bonding between the bodies 2, 3 as a result of this cross-linking. For each assembly obtained with one of formulas $F_1$ to $F_9$ the curing in the enclosure is carried out in two different manners:

use of a mixture of air and steam at 140° C. under a pressure of 5.5 bars; curing effected for 3 hours;

use of dry air at 125° C. under a pressure of 5.5 bars; curing effected for 2½ hours.

It goes without saying that upon the curing the heating could be produced by means other than the fluid under pressure, for instance by radiation.

Figure 2:
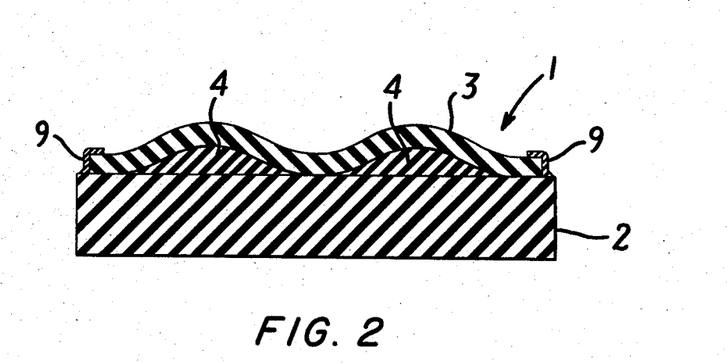
FIG. 2 is a cross-section through a cured assembly produced in accordance with the present invention.

After the curing, the test piece is removed from the enclosure and cut apart in order visually to examine the state of adherence between the bodies 2, 3. Such a cut is shown in FIG. 2.

In all cases the following findings are made:

the adherence between the bodies 2, 3 is perfect;

the bodies 2, 3 adhere closely to each other and to the bars 4, which have a crushed shape, that is to say, there is no longer any air between the bodies 2, 3 and there has been no migration of fluid under pressure coming from the enclosure towards the inside of the test piece 1.

According to the present inventor, the explanation of this phenomenon is as follows:

The values previously cited for the material 8 concerning the viscosity and the dry extract make it possible to spread this material very uniformly over the faces 2A, 3B, 3C and over the outside of the interface 5, obtaining good contact between this material 8 and the bodies 2, 3.

After cross-linking at room temperature of the unsaturated elastomer or elastomers of the material 8 there is obtained a thin, elastic, strong membrane 9 which forms a joint. Since this cross-linking is obtained at ambient temperature, there is no expansion during this cross-linking of the air enclosed within the test piece 1 and therefore there is no separation of the membrane from the bodies 2, 3 or any rupturing of this membrane during this cross-linking.

When the test piece 1 is placed in contact within the enclosure with the hot fluid under pressure, compression of the air contained within the test piece first of all takes place due to a crushing of the deformable bodies 2, 3 and of the bars 4, which are also deformable, and this without the compression fluid being able to penetrate into the test piece 1, because the membrane 9 which forms a joint prevents any penetration of gaseous fluid from the enclosure towards the inside of the test piece during this compression phase, which is very rapid (on the order of a second).

At the time of its inclusion in the test piece, the air had a pressure of about 1 bar. This pressure increases during this compression phase and becomes practically equal to the pressure of the compressed gas in the enclosure.

As a result of the contact of the test piece 1 with the hot gaseous fluid, an increase of the temperature within the test piece 1 then takes place. The pressure of the air therefore increases further within this test piece and becomes greater than the pressure of the gaseous fluid in the enclosure outside the test piece. The air therefore diffuses continuously during this heating from the inside of the test piece 1 to the outside of the test piece, that is to say, towards the hot gaseous fluid.

This migration takes place through the membrane 9, which acts as a permeable membrane, for the entire time that this heating phase of the test piece lasts. This time is longer the larger the assembly to be cured; it is, for instance, on the order of 5 minutes in the example described. The migration of air continues during all of this time so that no further air remains within the test piece. The cross-linking of the body 3 and the bars 4 during the curing is relatively slow and takes place after evacuation of the air from the test piece.

The draining of the air towards the membrane 9 within the test piece 1 is made possible by the presence of imperfect contacts between the faces 2A, 3A, due to the brushing of the face 2A.

These imperfect contacts could be obtained in any other manner, for instance by using drainage means such as, for instance, threads, fibers, cables, woven materials or non-wovens.

Due to the present invention, the membrane 9 plays the complicated and apparently contradictory roles previously described. This for the following reasons: The values previously indicated for the material 8 with respect, in particular, to the viscosity and the dry extract make it possible to obtain a membrane 9 which, within the enclosure, is both mechanically resistant, impermeable during the phase of compression of the test piece under the effect of the gaseous fluid of the enclosure, and permeable during the subsequent phase of the heating of the test piece 1, and this for a slight thickness of the membrane 9 in the portion thereof covering the outside of the interface 5, since for a thickness of more than 1 mm in this portion the membrane 9 is no longer sufficiently permeable to permit the evacuation of the air initially enclosed within the test piece 1.

In accordance with the present invention, the nature of the material used to produce the joint and the thickness of the joint in the portion thereof covering the outside of the interface constitute a compromise such that, on the one hand, upon the compression phase, the rate of diffusion is too slow for the fluid of the enclosure to be able to penetrate into the test piece while, on the other hand, upon the heating phase, the rate of diffusion is sufficient to permit the evacuation of the air from the test piece before cross-linking of the body 3.

The present invention makes it possible to obtain the following advantages:

(1) It is no longer necessary to eliminate the air between the assembled faces before curing, or else this operation can be carried out rapidly, without particular care, resulting in a substantial gain in time, and in particular the certainty of always obtaining perfect adherence of the faces in contact after the curing.

(2) It is possible to choose the elastomer or elastomers of the material in such a manner that they are compatible with the bodies to be connected. Under these conditions it is not necessary to remove the joint after curing, which joint can thus remain fastened on the cured assembly during its use, since there is then no longer any risk of contamination or separation.

The explanation of this fact is as follows: The joint frequently penetrates between the assembled faces, in particular upon the placing under pressure within the enclosure. When the elastomers of the joint are incompatible with the bodies with which it is in contact, as a result of this penetration, there may be contamination there of these bodies at their interface by the elastomers of the joint, this contamination leading, finally, to separations as a result of dynamic stresses, so that it is generally necessary to remove the joint and machine the contaminated surfaces of the bodies before the use of the cured assembly, for instance by grinding, brushing, cutting, sanding, etc. The fact that the joint is left on the cured assembly makes it possible to simplify the process of production of the assembly and also makes it possible to reduce the cost. For this reason, upon the manufacture, repair or recapping of tires it is advantageous, in order to produce the joint, not to use unsaturated elastomers of the butyl type (that is to say, halogenated or non-halogenated isobutylene-isoprene copolymers) or of the EPT type or saturated elastomers (in particular polyisobutylene and elastomers of the EPR type) since these elastomers, in the same way as the silicones, are generally not compatible with the unsaturated elastomers usually used in the tire industry.

(3) The material can be produced with elastomers of definitely lower cost than the silicone elastomers.

The preferred values mentioned above with respect in particular to the viscosity, dry extract and arithmetic molecular weight of the elastomer fraction make it possible to obtain the best compromise between ease of application of the material 8 and good operation of the membrane 9 in the enclosure.

The present inventor then carried out tests using for the material 8 formulas not in accordance with the present invention due to at least one of the following reasons:

viscosity less than 0.3 Pa.s or greater than 700 Pa.s;
dry extract less than 20% or greater than 80% (percentage by weight based on the weight of the fluid mixture);
elastomer fraction without unsaturated elastomer or comprising less than 20% by weight thereof;
cross-linking by heating for a period of time of more than one minute.

Figure 3:
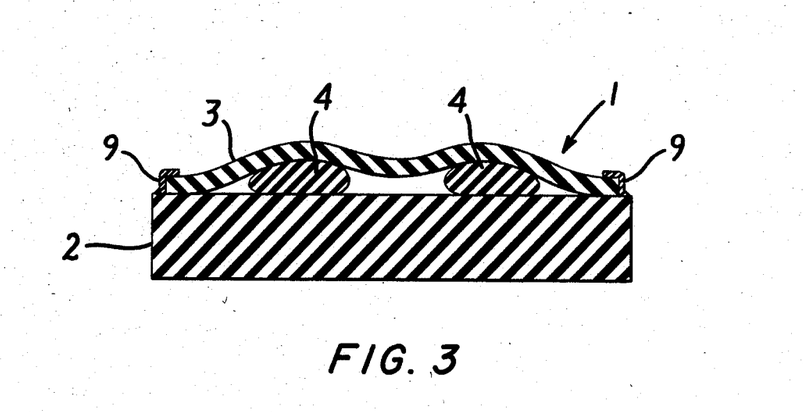
FIG. 3 is a cross-section through a defective cured assembly, this assembly not being produced in accordance with the present invention.

In all the cases the results were unsatisfactory for at least one of the following reasons:

deformation or rupture of the membrane 9 upon cross-linking of the elastomer or elastomers of the material 8;
bad adherence of the joint 9 to the bodies 2, 3 or merely pointwise bonding;
rupture of the membrane 9 in the enclosure;
penetration of the gaseous fluid from the enclosure to the inside of the test piece;
insufficient permeability of the membrane 9 upon the phase of the heating of the test piece within the enclosure, hence the presence of air in the cured test piece 1 upon emergence from the enclosure. FIG. 3, for instance, shows such a defective test piece.

By way of example, Table 2 below gives, for the material 8, two formulas $F_{10}$ and $F_{11}$ which are not in accordance with the present invention, these formulas causing the following drawbacks:

formula $F_{10}$ leads to a rupture of the joint 9 upon its formation by cross-linking;
formual $F_{11}$ produces a joint 9 which is not sufficiently strong and not sufficiently permeable to permit the evacuation of the air upon the heating phase.

TABLE 2

| Formula | $F_{10}$ | $F_{11}$ |
|---|---|---|
| Nature of the elastomer | NR | IR |
| Average molecular weight of the elastomer (equal to $P_{ma}$) | 600,000 | 300,000 |
| Composition of the dry extract (parts by weight) | | |
| elastomer | 100 | 100 |
| zinc oxide (ZnO) | 3 | |
| stearic acid | 1 | |
| cyclohexylbenzothiazyl sulfenamide | 2 | |
| sulfur | 3 | |
| HAF-HS (carbon black grade N 339) | | 30 |

TABLE 2-continued

| Formula | $F_{10}$ | $F_{11}$ |
|---|---|---|
| HAF (carbon black grade N 330) | 50 | |
| Nature of the solvent | 100/160 | 100/160 |
| % of dry extract | 30% | 30% |
| Viscosity (Pa · s) measured in a Brookfield viscosimeter | 30 | 25 |
| Permeability of the joint obtained after cross-linking ($m^3 \cdot m/s \cdot m^2 \cdot Pa$) (ISO Standard 2782) | $1.6 \times 10^{-16}$ | $3 \times 10^{-18}$ |

Remarks Concerning Table 2
1. The elastomer fraction of formulas $F_{10}$ and $F_{11}$ consists entirely of a single elastomer.
2. The cross-linking of the natural rubber (formula $F_{10}$) is effected at 150° C. for 30 minutes.
3. The solvent 100/160 has the same definition as that given above in the remarks concerning Table 1, as do the abbreviations NR, IR.

Figure 4:
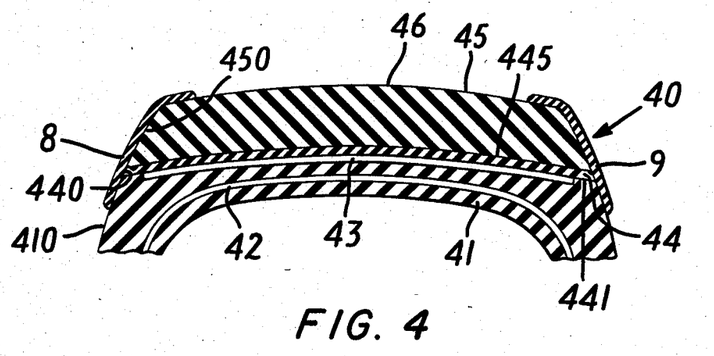
FIG. 4 is a radial section through the crown of a tire made in accordance with the present invention.

FIG. 4 shows another embodiment of the present invention, this embodiment being applied to the recapping art. This figure shows the upper portion of a tire 40. This tire comprises a carcass 41 of cross-linked rubber, reinforced by cords 42 which are continuous from one bead to the other. For purposes of simplification, the beads of the tire 40 have not been shown in the drawing. The tire 40 comprises a reinforcement 43 arranged on the crown of the carcass 41. Above the carcass 41 and the reinforcement 43 there is applied a layer of cross-linkable connecting rubber 44 in the form of a deformable solid or a solution. Over the connecting layer 44 there are applied, for instance by winding, several plies of a sheet of cross-linkable rubber 45, these plies being intended to form the tread 46 after cross-linking.

The material 8 is then applied in such a manner that it covers the side faces 440 of the layer 44, a part of the side faces 410 of the carcass 41, and the side faces 450 of the plies 45. On each side of the tire 40, the material 8 therefore covers the outside of the interface 441 between the layer 44 and the carcass 41 and the outside of the interface 445 between the layer 44 and the plies 45. The material 8, which straddles the carcass 41, the layer 44 and the plies 45, extends, for instance, below the layer 44 and over the ply 45, the width of these two end zones where the material 8 extends being about 20 mm, this width being measured in the radial plane of FIG. 4. The formula of the material 8 corresponds, for instance, to any one of the formulas $F_1$ to $F_7$, and the formulas of the rubbers used for the carcass 41, the layer 44 and the plies 45 correspond, for instance, to the definitions given above for the bodies 2, 3, but without using unsaturated elastomers of the butyl or EPT type or saturated elastomers. The amount of material 8 is such that the thickness of the joint 9, after cross-linking of the material 8, is from 0.1 mm to 1 mm on the portions of the joint which cover the outside of the interfaces 441, 445.

The cross-linking of the unsaturated elastomer or elastomers contained in the material 8 and the subsequent curing of the tire 40 are effected in the manner described previously for the test piece 1, this curing having the purpose of cross-linking the sheet 45 and the layer 44.

When the tire 40 was removed from the enclosure, the film 9 which formed the joint was apparently in the same condition as before the introduction of the tire into the enclosure. A careful examination of the cured tire 40 removed from the enclosure did not disclose the presence of any air pocket at the interfaces 441, 445 on either side of the connecting layer 44.

Tear tests on the tread 46 did not show any lack of bonding of the plies of the sheet 45 to each other or of said sheet 45 to the layer 44 nor any defect in bonding between the layer 44 and the carcass 41.

Figure 5:
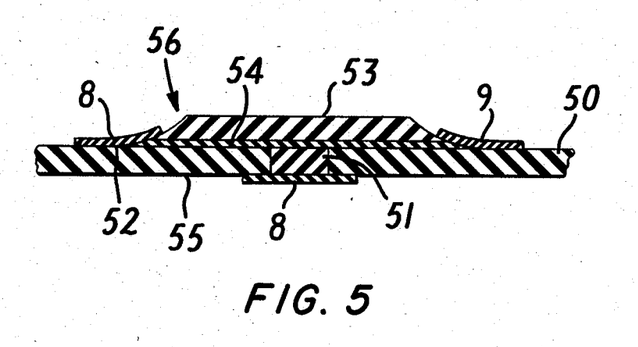
FIG. 5 is a cross-section through another assembly developed in accordance with the present invention, this assembly corresponding to the repair of an injury in a rubber article.

FIG. 5 shows another embodiment of the present invention. This figure shows an article 50 of rubber, for instance a tire sidewall, in which an injury 51 has been repaired in the manner known per se. Onto the upper face 52 of the article 50 there has been applied a fluid-tight repair patch 53 having a cross-linkable connecting layer 54, if this patch 53 is already cross-linked. After having placed the patch 53 on the face 52, a layer of material 8 is applied on the beveled edges of the patch 53 and the connecting layer 54 and on the adjacent portions of the face 52.

A layer of material 8 is also applied onto the face 55 of the article 50 opposite the face 52, that is to say, on the inner face of this article, against the repaired injury 51. The formula of the material 8 corresponds, for instance, to any of the formulas F₁ to F₇ previously described, and the formulas of the rubbers used for the article 50, the repair 51, the patch 53 and the layer 54 correspond, for instance, to the definitions given previously for the bodies 2, 3 but without using unsaturated elastomers of butyl or EPT type or saturated elastomers. The quantity of material 8 is such that the thickness of the joint 9 after the cross-linking of the material 8 is in accordance with the invention.

The cross-linking of the unsaturated elastomer or elastomers contained in the material 8 and the subsequent curing of the assembly 56, formed by the article 50, the repaired injury 51, the patch 53, the layer 54 and the joints 9, are effected in the manner described above in connection with the test piece 1, this curing having the purpose of cross-linking the materials of this assembly which were still not cross-linked.

Upon removal from the enclosure after curing, it is noted that the patch 53 and the repair 51 adhere perfectly to the article 50 even if air remained imprisoned in the assembly 56 before curing.

For clarity of the drawing, the thickness of the joint 9 has been exaggerated in FIGS. 1 to 5.

In all the above examples the bodies to be connected were of rubber.

It goes without saying that the present invention applies to cases in which at least one of the bodies to be connected is of deformable material without rubber, for instance a thermoplastic polymer.

The present invention also covers the cases in which the material forming the joint in accordance with the present invention is applied to only a portion of the outside of the interface or interfaces, the rest of the outside of the interface or interfaces being covered by an impervious joint during the heating phase. In this case it is preferable to use means which make it possible to drain the air enclosed between the bodies towards the joint in accordance with the present invention, these means comprising, for instance, threads, fibers, cables, woven materials or non-wovens.

Of course, the present invention is not limited to the embodiments which have been described above.

What is claimed is:

1. A material intended to form a joint between at least two bodies on the outside of their interface, at least one of the bodies being deformable, characterized by the following features:

(a) it is a mixture comprising at least one solvent and at least one elastomer, said mixture having a Brookfield viscosity, measured at 20° C., of from 0.3 Pa.s to 700 Pa.s;

(b) this mixture has a volatile part which can be evaporated at 20° C., 1 bar, to yield a dry extract which is from 20% by weight to 80% by weight, based on the weight of the mixture;

(c) the dry extract of the mixture comprises an elastomer fraction at least 20% by weight of which elastomer fraction is formed of at least one unsaturated elastomer capable of cross-linking either at ambient temperature of by heating for a period of time of less than one minute;

(d) the dry extract comprises from 3 to 9 parts by weight of sulfur per 100 parts by weight of the elastomer fraction;

(e) the dry extract comprises at least two cross-linking accelerators belonging to different families selected from the group consisting of xanthates, amines and carbamates, in the following proportions, per 100 parts by weight of the elastomer fraction;

xanthate or total xanthates: 1 to 4 parts by weight;

amine or total amines: 0.2 to 1 part by weight;

carbamate or total carbamates: 2 to 4 parts by weight;

(f) the dry extract comprises at least one cross-linking accelerator metallic oxide selected from among zinc oxide (ZnO), lead oxide (PbO2) and magnesium oxide (MgO), the proportion of the oxide or of the total oxides being from 2 to 10 parts by weight per 100 parts by weight of the elastomer fraction.

2. A material according to claim 1, characterized by the fact that the viscosity of the mixture is from 10 Pa.s to 50 Pa.s.

3. A material according to claim 1 characterized by the fact that the dry extract of the mixture is from 30% by weight to 70% by weight, based on the weight of the mixture.

4. A material according to claim 1, characterized by the fact that the unsaturated elastomer is one of the following elastomers: a natural rubber, a polyisoprene, a polybutadiene, a polychloroprene, a styrene-butadiene copolymer, an isobutylene-isoprene copolymer, a halogenated isobutylene-isoprene copolymer, and a terpolymer having a base of ethylene and propylene (EPT).

5. A material according to claim 4, characterized by the fact that the unsaturated elastomer is one of the following elastomers: a natural rubber, a polyisoprene, a polybutadiene, a polychloroprene and a styrene-butadiene copolymer.

6. A material according to claim 1, characterized by the fact that the elastomer fraction is formed of at least 60% by weight of at least one unsaturated elastomer.

7. A material according to claim 6, characterized by the fact that the elastomer fraction is formed of at least 80% by weight of at least one unsaturated elastomer.

8. A material according to claim 1, characterized by the fact that the dry extract comprises at least 40% by weight of elastomer fraction.

9. A material according to claim 8, characterized by the fact that the dry extract comprises at least 60% by weight of elastomer fraction.

10. A material according to claim 1, characterized by the fact that the arithmetic molecular weight $P_{ma}$ of the elastomer fraction is from 6,000 to 600,000.

11. A material according to claim 1, characterized by the fact that the dry extract comprises from 0.5 to 3 parts by weight of stearic acid per 100 parts by weight of the elastomer fraction.

12. A material according to claim 1, characterized by the fact that the dry extract comprises from 10 to 50 parts by weight of silica per 100 parts by weight of the elastomer fraction.

13. A material according to claim 1, characterized by the fact that the dry extract comprises from 10 to 50 parts by weight of carbon black per 100 parts by weight of the elastomer fraction.

14. A material according to claim 1, characterized by the fact that the dry extract comprises from 5 to 15 parts by weight of organic resin per 100 parts by weight of the elastomer fraction.

* * * * *

UNITED STATES PATENT AND TRADEMARK OFFICE
CERTIFICATE OF CORRECTION

PATENT NO. : 4,578,421
DATED : March 25, 1986
INVENTOR(S) : Jean-Louis Tournier

It is certified that error appears in the above-identified patent and that said Letters Patent is hereby corrected as shown below:

Column 5, line 56, "$\Sigma_e = 1$" should read -- $\Sigma P_e = 1$ --.

Column 14, line 13, first occurrence, "of" should read -- or --; line 22, "carbamates ..." should follow immediately after the word "and" in the preceding line; line 26, "carbamate" should appear directly under the word "amine" in the preceding line.

Signed and Sealed this

Sixteenth Day of September 1986

[SEAL]

Attest:

DONALD J. QUIGG

Attesting Officer

Commissioner of Patents and Trademarks